United States Patent [19]

Umrigar et al.

[11] Patent Number: 5,487,998
[45] Date of Patent: Jan. 30, 1996

[54] TRAPPING OF AFLATOXINS AND PHYTOESTROGENS

[75] Inventors: Pesi P. Umrigar, Kenner; Shia S. Kuan, Metarie, both of La.

[73] Assignee: The United States of America as represented by the Secreatry of the Department of Health and Human Services, Washington, D.C.

[21] Appl. No.: 1,573

[22] Filed: Jan. 6, 1993

[51] Int. Cl.$^6$ .................................................. G01N 33/00
[52] U.S. Cl. ........................... 436/93; 436/91; 436/139; 436/140; 536/46; 536/103
[58] Field of Search ...................... 436/139, 140, 436/86, 124, 87, 93, 91; 536/46, 103

[56] References Cited

U.S. PATENT DOCUMENTS

| | | | |
|---|---|---|---|
| 3,515,736 | 6/1970 | Goldblatt et al. | 264/412.4 |
| 4,274,985 | 6/1981 | Szejtli et al. | 260/17.4 ST |
| 4,285,698 | 8/1981 | Otto et al. | 23/230 B |
| 4,357,468 | 11/1982 | Szejtli et al. | 536/56 |
| 4,460,475 | 7/1984 | Hayatsu et al. | 210/674 |
| 4,535,152 | 8/1985 | Szejtli et al. | 536/103 |
| 4,726,905 | 2/1988 | Friedman et al. | 210/692 |
| 4,818,687 | 4/1989 | Groopman et al. | 436/518 |
| 4,835,100 | 5/1989 | Dixon et al. | 435/7 |
| 4,859,611 | 8/1989 | Groopman et al. | 436/518 |
| 4,895,808 | 1/1990 | Romer | 436/178 |
| 5,110,558 | 5/1992 | Romer | 422/101 |
| 5,141,764 | 8/1992 | Fleury et al. | 424/195.1 |

FOREIGN PATENT DOCUMENTS

WO92/12180  7/1992  WIPO .

OTHER PUBLICATIONS

Vazquez et al., "Cyclodextrin as Modifiers of the Luminescence Characteristics of Aflatoxin", Analytica Chimica Acta, 1991 pp. 343–350.

LaFont et al., "Assay Method for Aflatoxins in Milk," Journal of Chromatography, 1981 pp. 162–166.

Setchell et al., "High–Performance Liquid Chromatographic Analysis of Phytoestrogen," Journal of Chromatography, 1987 pp. 315–323.

Vazquez et al., "Liquid Chromatographic Study of the Interaction between Aflatoxin and β–cyclodextrin," 1992, pp. 239–247.

Hattori et al., "C–6–amino–β–cyclodextrin–β–cyclodextrin copolymer preparation from β–cyclodextrin" May 22, 1986.

Tabushi et al., "Capped Cyclodextrin" (Communications to the Editor), *J. Am. Chem. Soc.*, 98(24), 7855–7856 (Nov. 24, 1976).

Boger et al., "Cyclodextrin Chemistry, Selective Modification of all Primary Hydroxyl Groups of α– and β–Cyclodextrins," *Helvetica Chimica Acta*, 62(6), 2190–2218 (1978).

Shiraishi et al., "Immobilization of β–Cyclodextrin on Silica Gel," *Bull. Chem. Soc. Jpn.*, 59(2), 507–510 (Feb. 1986).

Melton et al., "Synthesis of Monosubstituted Cyclohexaamyloses," *Carbohyd. Res*, 18, 29–37 (1971).

Croft et al., "Synthesis of Chemically Modified Cyclodextrins," *Tetrahedron*, 39(9), 1417–1474 (1983).

Kawagughi et al., "Sorption Behavior of Aromatic Compounds in Water on β–Cyclodextrin Polyurethane Resins," *Bull. Chem. Soc. Jpn*, 55, 2611–2614 (1982).

*Primary Examiner*—Donald E. Czaja
*Assistant Examiner*—Lien Tran
*Attorney, Agent, or Firm*—Leydig, Voit & Mayer, Ltd.

[57] ABSTRACT

Halo, azido, and amino cyclodextrin/epichlorohydrin copolymers, methods of preparing the copolymers, and the use of the copolymers for removing aflatoxins and phytoestrogens from a sample, for detecting the presence of aflatoxins and phytoestrogens, and for quantifying aflatoxin and phytoestrogen levels.

16 Claims, 5 Drawing Sheets

AFLATOXIN B₁

AFLATOXIN B₂

AFLATOXIN G₁

AFLATOXIN G₂

AFLATOXIN M₁

AFLATOXIN M₂

FORMONONETIN

DIADZEIN

EQUOL

BIOCHANIN A

GENISTEIN p-ETHYLPHENOL

COUMESTROL

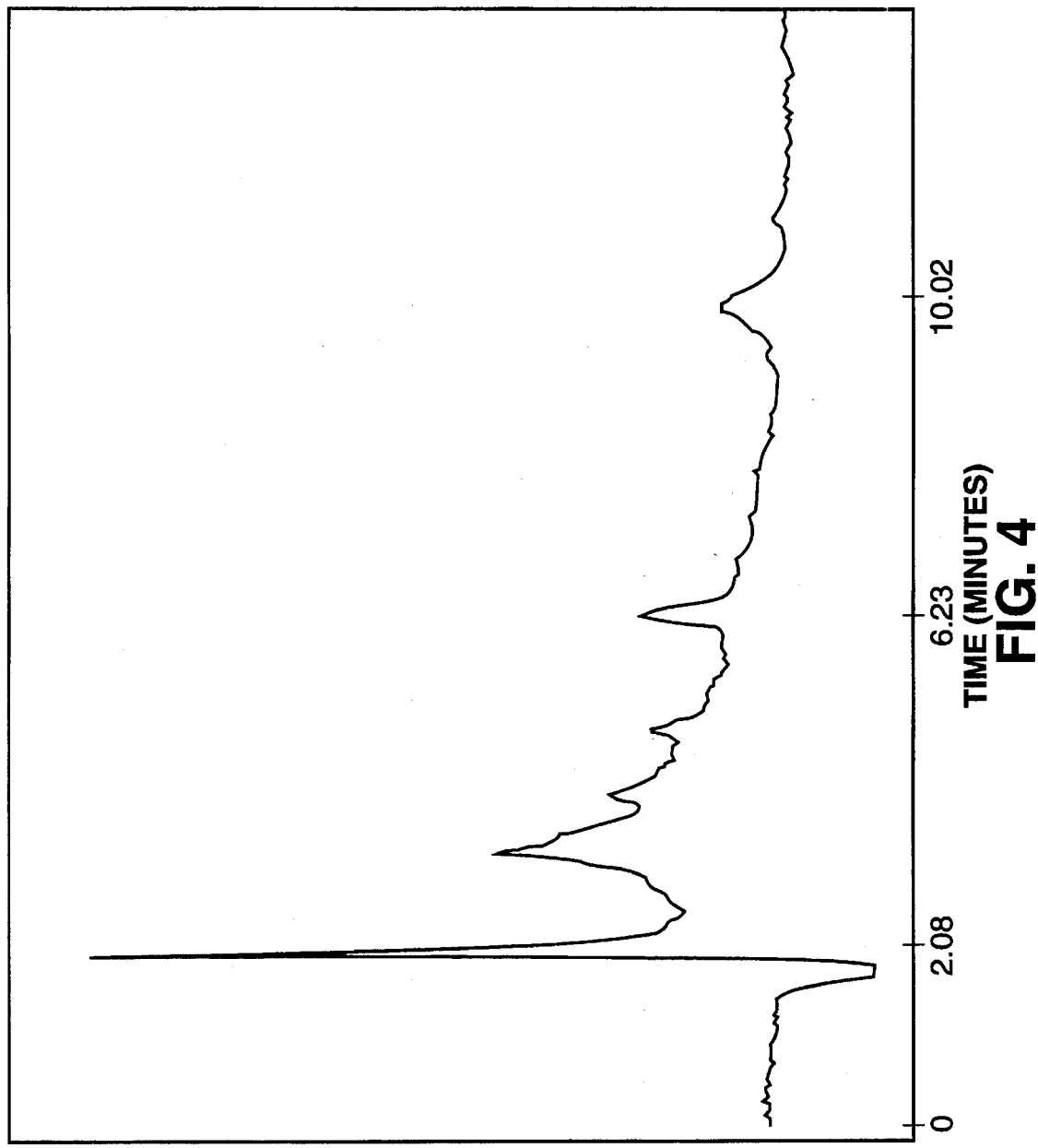

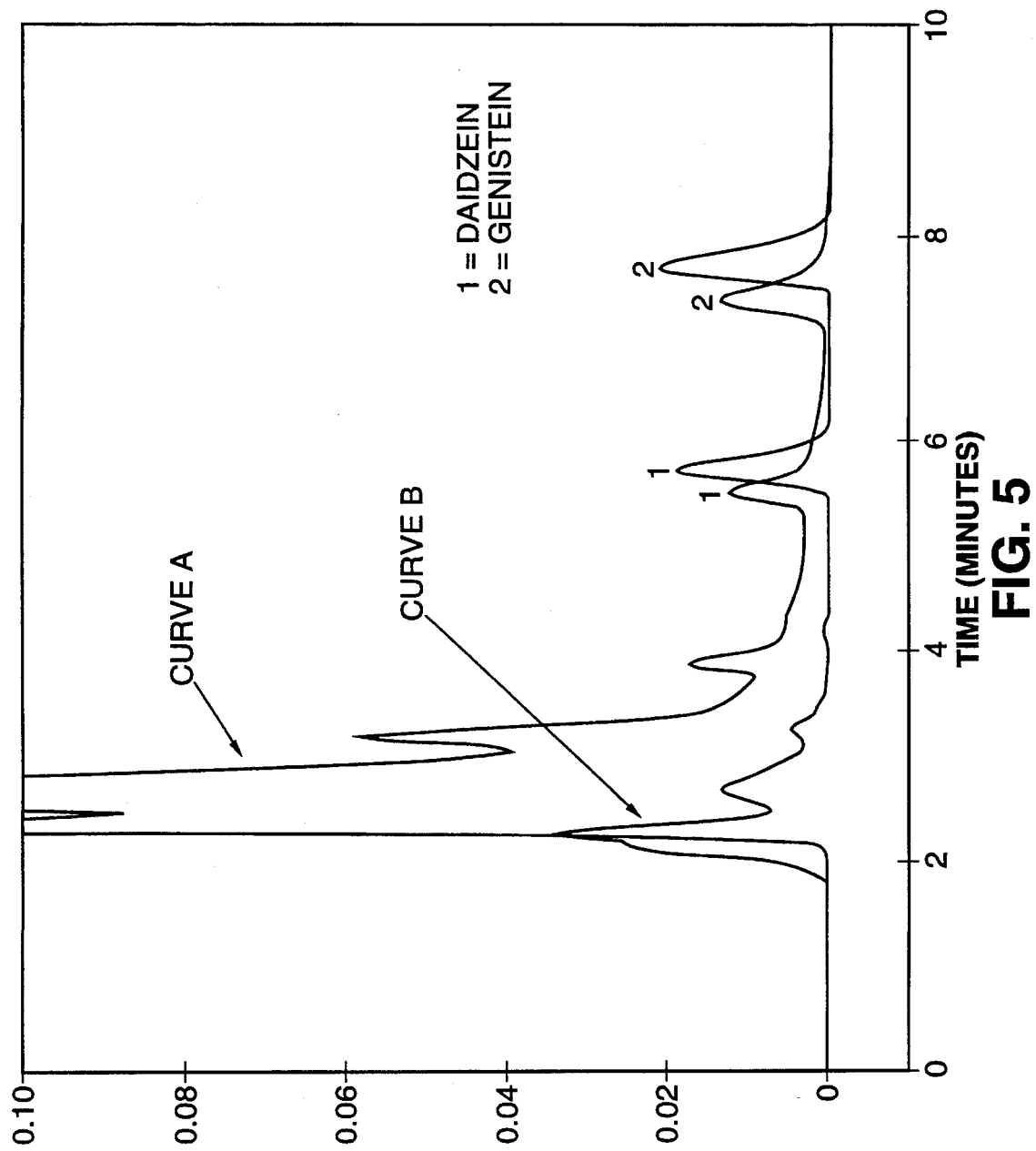

TRAPPING OF AFLATOXINS AND PHYTOESTROGENS

TECHNICAL FIELD OF THE INVENTION

The present invention relates to new derivatives of a cyclodextrin/epichlorohydrin copolymer and the use of such compounds for removing aflatoxins and phytoestrogens from a sample, for detecting the presence of aflatoxins and phytoestrogens, and for quantifying aflatoxin and phytoestrogen levels.

BACKGROUND OF THE INVENTION

It has long been recognized that limiting the exposure of both humans and animals to toxic or carcinogenic substances in food, water, and air is critical to our survival. Of all the toxic or carcinogenic substances that can be encountered in the environment, aflatoxins are especially important, since the presence of even minute quantities of these fungal metabolites constitute a serious health hazard. Aflatoxins are polycyclic aromatic compounds that are found in foods such as grain and peanuts as a consequence of the manner in which the foods were grown, handled, or stored. A variety of aflatoxins, including $B_1$, $B_2$, $G_1$, $G_2$, $M_1$, and $M_2$, have been isolated and characterized. Aflatoxin $B_1$ is the most biologically potent of these compounds, and, as well as being a potent toxin, is also a mutagen and carcinogen.

Since aflatoxins endanger public health, it is a common practice to run regular tests for aflatoxins on samples of certain foodstuffs. Such tests are typically conducted by extracting samples with an appropriate solvent, and then using standard techniques such as high pressure liquid chromatography (HPLC) to detect and quantitate aflatoxins. For example, the use of HPLC for analysis of aflatoxins in peanuts is described in U.S. Pat. No. 4,285,698.

Most samples contain numerous contaminants in addition to aflatoxins. These substances can interfere with the quantitative and qualitative detection of the toxins. Because of this, sample extracts need to undergo further processing to remove the interfering substances. Additional processing of sample extracts is usually accomplished by passing the extract through a special "cleanup" column, which retains the aflatoxins while allowing the interfering substances to pass through. The aflatoxins are then eluted from the column with the appropriate solvent to yield a purified extract which can be analyzed by HPLC, or some other means.

Sample cleanup is currently accomplished through the use of immunoaffinity columns, as described in U.S. Pat. Nos. 4,818,687 and 4,859,611. The immunoaffinity columns are prepared by immobilizing on a solid support antibodies that are specific to aflatoxins. Upon passing crude food extract through the column, the aflatoxins bind to the immobilized antibodies and are selectively retained. Some major drawbacks associated with the use of immunoaffinity columns include the high cost of preparation, limited shelf-life, and non-reusability. Additionally, the immunoaffinity columns cannot be used for the detection or cleanup of structurally related compounds such as phytoestrogens, which contaminate soy and soy-based products including infant formula, as well as feed products like alfalfa. This is significant, as there has been much recent concern regarding the methods of detecting and removing phytoestrogens from food sources due to their demonstrated estrogenic effects and potential for carcinogenicity.

Cyclodextrin polymers have also been employed to filter contaminants from samples, as described in U.S. Pat. Nos. 4,726,905, 4,274,985, and 4,357,468. The '905 patent discloses a cyclodextrin polymer capable of filtering polychlorinated biphenyl compounds. The '985 and '468 patents disclose cyclodextrin polymers that are capable of filtering nicotine, benzene, phenol, cresol, and tar. While the polymers disclosed in these patents remove aromatic compounds from samples, the size, complexity, and physical nature of the removed compounds significantly differ. This suggests that the polymers would be ineffective in aflatoxin or phytoestrogen cleanup. In fact, some cyclodextrin copolymers, such as β-cyclodextrin/epichlorohydrin copolymer, do not retain aflatoxins or phytoestrogens.

Consequently, there remains a need for a compound that effectively removes aflatoxins and phytoestrogens from samples, is chemically stable, is less expensive than immunoaffinity columns to manufacture, and is reusable at least once. It is an object of the present invention to provide a compound that satisfies these criteria and, therefore, demonstrates significant utility for the cleanup of aflatoxin or phytoestrogen contaminated samples.

It is a further object of the present invention to provide a means of using such a compound to remove aflatoxins or phytoestrogens from a sample. It is another object of the present invention to provide a means of using such a compound to detect aflatoxins and phytoestrogens in a sample. It is yet another object of the present invention to provide a means of using such a compound to quantitate levels of aflatoxins or phytoestrogens in a sample.

These and other objects and advantages of the present invention, as well as additional inventive features, will be apparent from the description of the invention provided herein.

BRIEF SUMMARY OF THE INVENTION

The present invention concerns new derivatives of a copolymer of cyclodextrin and epichlorohydrin and methods of preparing such copolymers. The new derivatives of the present invention include halo, azido, and amino cyclodextrin/epichlorohydrin copolymers, with the brominated β-cyclodextrin/epichlorohydrin copolymer being of particular interest. The copolymers of the present invention possess the useful property of retaining aflatoxins and phytoestrogens. Thus, these compounds can be used for removing aflatoxins and phytoestrogens from a sample, for detecting the presence of aflatoxins and phytoestrogens, and for quantifying aflatoxin and phytoestrogen levels.

BRIEF DESCRIPTION OF THE DRAWINGS

FIG. 4 is a graphical display presenting a tracing of a HPLC chromatogram showing the impurities retained by the brominated β-cyclodextrin/epichlorohydrin copolymer column.

FIG. 5 is a graphical display presenting tracings of HPLC chromatograms showing the levels of phytoestrogens and impurities in a sample prior to cleanup and the levels of phytoestrogens retained by the brominated β-cyclodextrin/ epichlorohydrin copolymer.

DESCRIPTION OF THE PREFERRED EMBODIMENTS

Figure 1A:
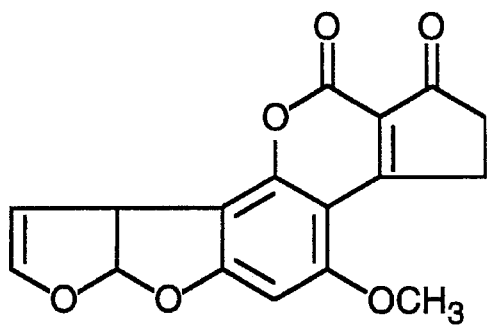
FIGS. 1A–F set forth the chemical structures of aflatoxins $B_1$, $B_2$, $G_1$, $G_2$, $M_1$, and $M_2$, respectively.

The present invention concerns new derivatives of a copolymer of cyclodextrin and epichlorohydrin. These new copolymers have proven particularly useful in trapping aflatoxins and phytoestrogens.

The present inventive derivatives of the cyclodextrin/ epichlorohydrin copolymer include halo, azido, and amino cyclodextrin/epichlorohydrin copolymers. The preferred cyclodextrin for use in the context of the present invention is β-cyclodextrin because of its relatively easy availability and low cost. Other cyclodextrins, however, such as the α- and γ-cyclodextrins, or mixtures of cyclodextrins may be used to form the copolymer of the present invention. While the present inventive copolymers have demonstrated at least some ability to trap aflatoxins and phytoestrogens, the halo and azido cyclodextrin/epichlorohydrin copolymers have proven more effective in that respect. In particular, the halo derivatives exhibit the greatest effectiveness in trapping aflatoxins and phytoestrogens. While the present inventive copolymers include the various halo derivatives, the chloro, bromo, and iodo derivatives are preferred, with the bromo derivative being more preferred. The brominated β-cyclodextrin/epichlorohydrin copolymer is most preferred and has proven the most effective in trapping aflatoxins and phytoestrogens.

The present inventive copolymers are prepared by modifying the commercially available cyclodextrin/epichlorohydrin copolymer. In particular, the tosyl derivative of a cyclodextrin/epichlorohydrin copolymer is prepared and then reacted with either a suitable halogenated compound, such as potassium bromide, sodium iodide, or lithium chloride, to form the halo derivative, or a suitable azide, such as sodium azide, to form the azido derivative. The amino derivative may be prepared by further reaction of the azido derivative.

The present inventive derivatives of cyclodextrin/epichlorohydrin copolymer surprisingly render the copolymer, unlike the unmodified copolymer, capable of entrapping polycyclic aromatic compounds such as aflatoxins and phytoestrogens. This useful property, in combination with the high chemical stability of the present inventive copolymer, particularly the brominated cyclodextrin/epichlorohydrin copolymer, can be exploited in a method designed to remove aflatoxins and phytoestrogens from a sample. This method comprises preparing a sample believed to contain aflatoxins or phytoestrogens, and then contacting the sample with the copolymer of the present invention. The contacting step can be accomplished by any suitable means, such as by passing the sample through a column that has been packed with the present inventive copolymer.

This useful ability of the present inventive copolymer to retain aflatoxins and phytoestrogens can also be exploited in a method designed to detect the presence of these substances. This method comprises obtaining a sample of a material, such as grain or peanuts, believed to contain aflatoxins or phytoestrogens, contacting an extract of the sample with the present inventive copolymer under conditions suitable to effect entrapment by the copolymer of any aflatoxins or phytoestrogens present in the sample extract, removing unentrapped sample from the copolymer, and analyzing the sample entrapped by copolymer to detect the presence of aflatoxins or phytoestrogens, e.g., typically by removing entrapped sample from the copolymer and analyzing the removed sample for aflatoxins or phytoestrogens.

The present inventive derivatives of cyclodextrin/epichlorohydrin copolymer can further be used to quantitate levels of aflatoxins and phytoestrogens in a sample. Specifically, the copolymer is contacted with a sample as described above with respect to detecting aflatoxins or phytoestrogens in a sample. The isolated copolymer can then be analyzed by eluting any entrapped material from the copolymer and quantitating the aflatoxins or phytoestrogens in the eluant. The levels of aflatoxins or phytoestrogens in the eluant can be quantified by any suitable means, and the quantity of these substances in the eluant can be correlated with the quantity of aflatoxins or phytoestrogens in the sample. The inexpensiveness and reusable nature of the present inventive compound and methods render the present invention more suitable to the removal, detection, and quantification of aflatoxins and phytoestrogens than other techniques, such as those dependent on immunoaffinity columns.

These different uses of the present inventive copolymer are important in several applications. For example, the ability to remove, detect, and quantitate aflatoxins and phytoestrogens can be employed in the cleanup of feed and food samples as part of standard quality control measures, or as part of an attempt to limit exposure of humans and animals to these toxins by removing them from environmental reservoirs. Whereas the examples to be described herein demonstrate removal, detection, and quantification of aflatoxins from corn extract, and of phytoestrogens from soy and soy-based products, the present inventive derivatives of cyclodextrin/epichlorohydrin copolymer could also be used in the removal, detection, or quantification of these substances in other samples, including but not limited to peanuts, wheat, water, animal rations, milk, or alfalfa. Alternatively, the copolymer of the present invention can be used in the detection or quantification of aflatoxins and phytoestrogens in human or animal body fluids such as serum, urine, or milk, or in tissue extracts. This latter application is especially important as a non-invasive means of assessing the exposure of humans and animals to aflatoxins or phytoestrogens.

Figure 1B:
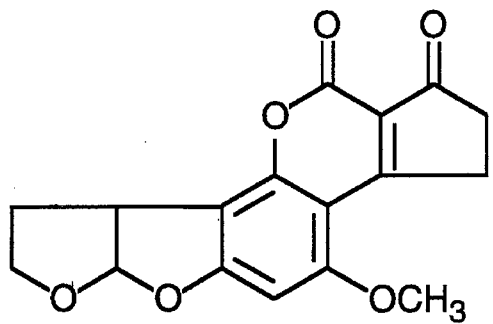
Figure 1C:
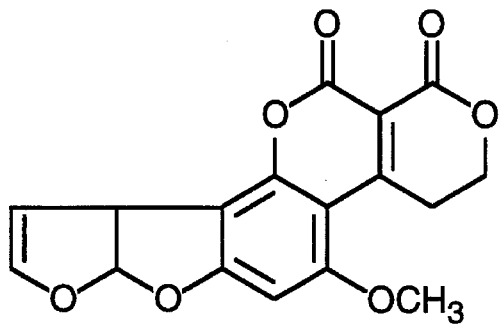
Figure 1D:
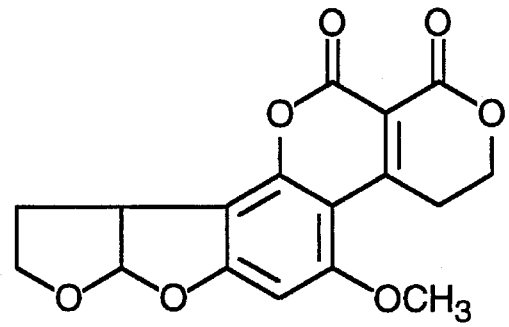
Figure 1E:
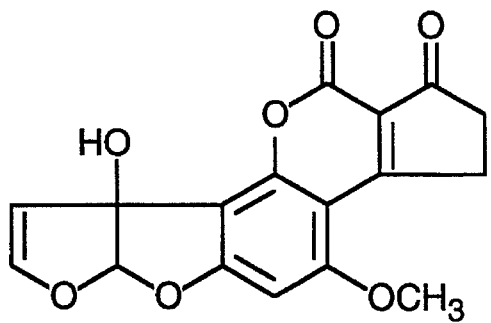
Figure 1F:
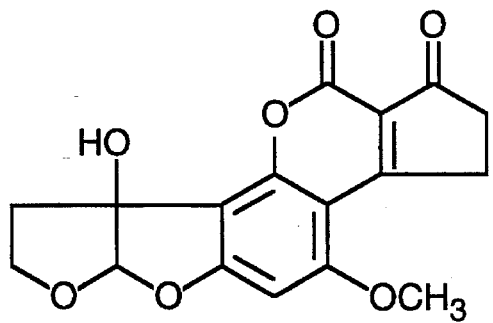
Figure 2A:
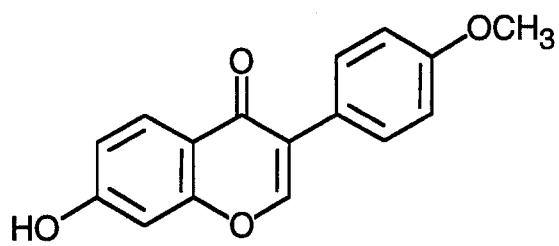
FIGS. 2A–G set forth the chemical structures of phytoestrogens formononetin, daidzein, equol, biochanin A, genistein, p-ethylphenol, and coumestrol, respectively.
Figure 2B:
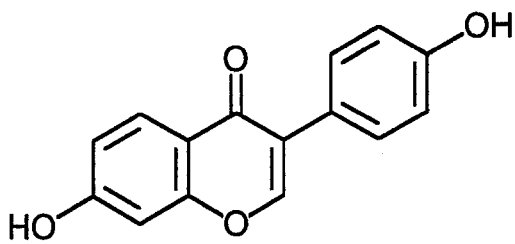
Figure 2C:
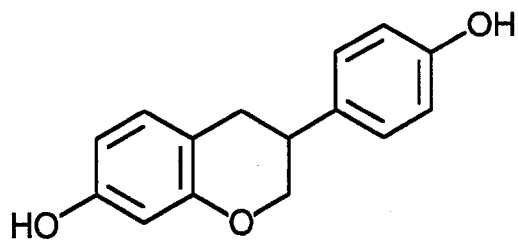
Figure 2D:
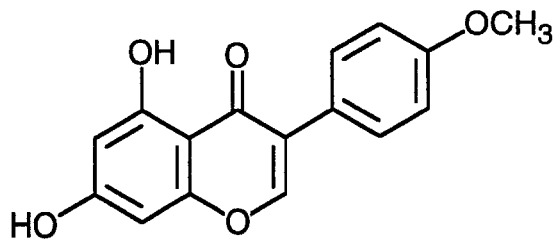
Figure 2E:
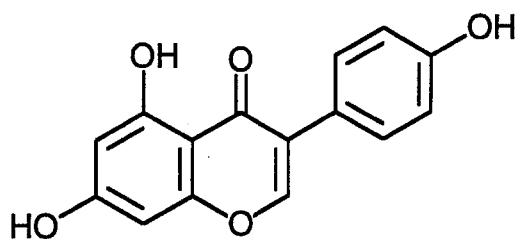
Figure 2F:
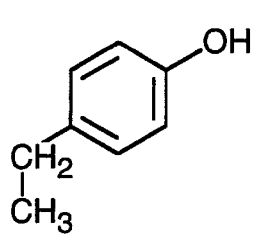
Figure 2G:
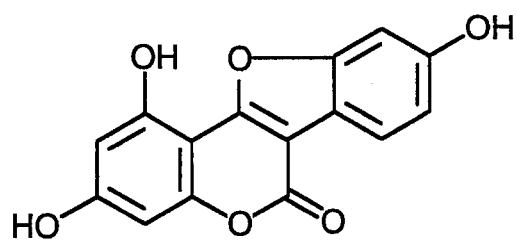
Figure 3:
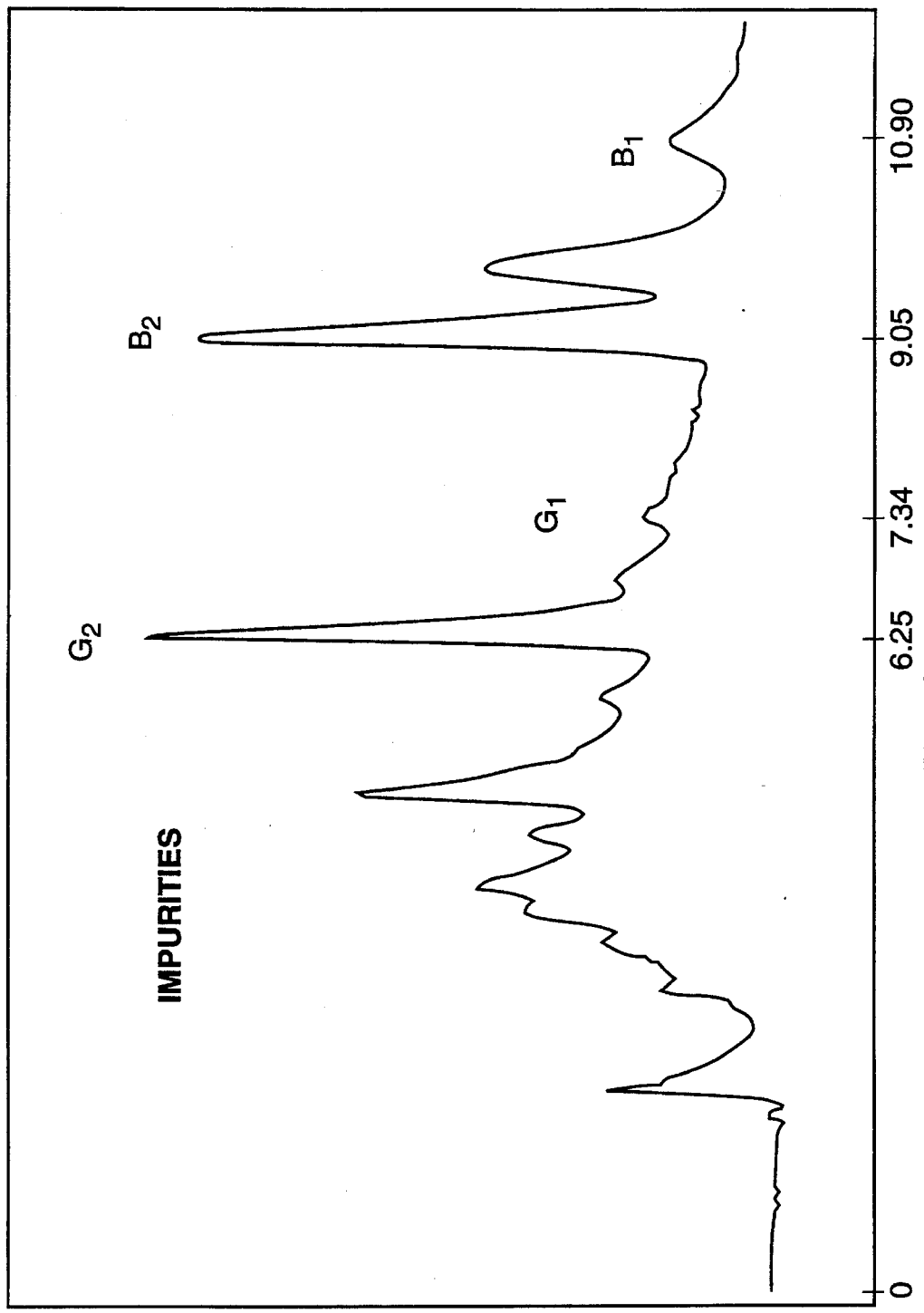
FIG. 3 is a graphical display presenting a tracing of a HPLC chromatogram showing the levels of aflatoxins retained by the brominated β-cyclodextrin/epichlorohydrin copolymer column.

The present invention is suitable for use in connection with any of the aflatoxins, or any combination or mixture thereof, e.g., aflatoxins $B_1$, $B_2$, $G_1$, $G_2$, $M_1$, and/or $M_2$. The present invention has particular usefulness with respect to the removal, detection, and quantification of aflatoxins $B_1$, $B_2$, $G_1$, and $G_2$. The structures of aflatoxins $B_1$, $B_2$, $G_1$, and $G_2$ are depicted as FIGS. 1A–F, respectively. The present invention is also suitable for use in connection with a variety of phytoestrogens, particularly those commonly found in plants. Such phytoestrogens include formononetin, daidzein, equol, biochanin A, genistein, p-ethylphenol, and coumestrol. The structures of these phytoestrogens are depicted as FIGS. 2A–G, respectively.

In removing, detecting, and quantifying the aflatoxins and phytoestrogens in a sample, the sample is contacted with a present inventive derivative of cyclodextrin/epichlorohydrin copolymer to trap any aflatoxins and phytoestrogens, and then, generally, the unentrapped portion of the sample is separated from the copolymer. This separation may be accomplished in any suitable manner, e.g., any method which removes the unentrapped material while not causing the release of the trapped material. Such a separation is preferably effected by washing the copolymer with water.

To the extent it is necessary or desirable to remove the trapped material from the copolymer after the separation of the unentrapped material is effected, such removal of the trapped material may be effected in any suitable manner. The removal of the trapped material preferably does not alter the trapped material and is substantially complete so as to ensure accurate determinations of the trapped material. Moreover, the removal of the trapped material preferably does not damage the copolymer, thereby allowing its reuse. Such a removal may be effected by washing the copolymer with an alcohol, such as methanol. The aflatoxins and phytoestrogens are preferably removed from the copolymer through the use of a methanol/water solution.

The following examples further illustrate the present invention but, of course, should not be construed as in any way limiting its scope.

EXAMPLE 1

This example describes a method of preparing the brominated β-cyclodextrin/epichlorohydrin copolymer of the present invention.

In the first step of the synthesis, a tosylate of β-cyclodextrin/epichlorohydrin copolymer was prepared. To achieve this end, 5 g of β-cyclodextrin/epichlorohydrin copolymer (Aldrich Chemical Co., Milwaukee, Wis.) and 75 ml of dry pyridine were placed in a dry flask equipped with a magnetic stirrer. The flask was immersed in an oil bath maintained at 25° C., and 5 g of tosyl chloride was added in small portions over the course of 10 minutes. The flask was stoppered well, and the mixture was stirred for 48 hours. The suspension was then poured into 500 ml distilled water at room temperature and stirred for an additional 30 minutes. The precipitate was allowed to settle, and the supernatant liquid was decanted. A further 500 ml of distilled water was added, and the mixture was stirred for 15 minutes. The precipitate was filtered off using suction and washed with 300 ml distilled water, followed by 300 ml of methanol. The precipitate was then dried in a current of air at room temperature for 4 hours. The product yield was 5.1 g. The infrared spectrum of the product confirmed the presence of the tosyl group. An elemental analysis confirmed a carbon content of 48.42%, a hydrogen content of 6.51%, and a sulfur content of 1.29%. The obtained material was stored in a tightly stoppered vial and was used within 48 hours of synthesis.

In the second step of the synthesis, a methylene bromide derivative was prepared from the tosyl derivative of the β-cyclodextrin/epichlorohydrin copolymer. Five g of the above-identified tosylate was suspended in 70 ml of dry N,N-dimethyl-formamide in a dry flask equipped with a magnetic stirrer. Ten grams of analytical reagent grade potassium bromide was added. The flask was immersed in an oil bath maintained at 100° C., and the mixture was stirred for 18 hours. At the end of this period, the flask was allowed to cool to room temperature. The contents of the flask were poured into 500 ml of distilled water and stirred for 30 minutes, following which the precipitate was allowed to settle, and the supernatant liquid was decanted. An additional 500 ml of distilled water was added to the precipitate, and the mixture was stirred for 15 minutes. The precipitate was then filtered off by applying suction, and was washed in succession with 300 ml of distilled water and 300 ml of methanol, and was then dried in a current of air at room temperature for 4 hours. The yield of product obtained was 4.6 g of an amorphous beige-colored powder which exhibited insolubility in water and common organic solvents, and exhibited an appreciable swelling action when added to water. The infrared spectrum of the obtained product validated the presence of a C-Br linkage. An elemental analysis confirmed a carbon content of 45.42%, a hydrogen content of 6.50%, and a bromine content of 4.03%.

EXAMPLE 2

This example verifies the effectiveness of the brominated β-cyclodextrin/epichlorohydrin copolymer prepared as in Example 1 for the removal, detection, and quantification of aflatoxins in contaminated samples.

A plastic column (i.d.=0.75 cm) equipped with a fritted disk was filled to a length of 2.5 cm with a water slurry of the brominated β-cyclodextrin/epichlorohydrin copolymer by applying suction to the bottom of the column. During filling of the column, the column was not allowed to dry at any time. Next, a corn extract was prepared for aflatoxin analysis by spiking 50 g of ground corn with aflatoxins $B_1$, $B_2$, $G_1$, and $G_2$ (Center for Food Safety and Applied Nutrition, Washington, D.C.), at levels of 10, 5, 10 and 5 ppb, respectively. One hundred ml of 80% methanol/water was added to the corn, and the mixture was blended at high speed for one minute. Next, one hundred-fifty ml of distilled water was added, following which the swirled mixture was filtered through fluted filter paper. Twenty ml of the filtrate was diluted to 50 ml with distilled water. Five ml of this solution was diluted again to 15 ml with distilled water, and the diluted sample extract was passed through the column by applying suction. The column was washed once with 10 ml distilled water. The aflatoxins were then eluted from the column with 5 ml of 80% methanol/water. The final eluant was diluted with distilled water to a volume of 6 ml, and 20 μl of the purified sample extract was injected into the HPLC. A portion of the unpurified sample was separately injected into the HPLC for comparison purposes. The HPLC system utilized the following: Beckman System Gold Programmable Solvent Module 126 (HPLC pump), Beckman Ultrasphere ODS Part No. 235329 (HPLC column), McPherson FL-750B Spectrofluorescence Detector with High Sensitivity Accessory (with a UT6 filter placed in the excitation path and a 440 nm cutoff filter in the emission path, where the excitation frequency was 364 nm), SpectraPhysics Datajet Integrator, a solvent of methanol:water (1:1 v/v), and a flow rate of 1 ml/minute.

The levels of impurities present in the unpurified sample prior to removing the aflatoxins were so great that an intense offscale absorption was obtained for the impurities, and the signals of the aflatoxins were obscured. In distinct contrast, following purification with use of the brominated β-cyclodextrin/epichlorohydrin copolymer column, impurities were dramatically reduced, and sharp signals were obtained for aflatoxins $G_2$, $G_1$, $B_2$, and $B_1$. A representative chromatogram of the purified sample extract presented in FIG. 3 verifies the effectiveness of the column in purifying aflatoxins. Representative aflatoxin percent recovery values obtained using the brominated β-cyclodextrin/epichlorohydrin copolymer for purification are presented in Table 1. These recovery values indicate excellent retention of aflatoxins by the brominated β-cyclodextrin/epichlorohydrin column, and excellent elution from the column.

TABLE 1

Recovery of aflatoxins from the brominated β-cyclodextrin/epichlorohydrin copolymer column

| Aflatoxin | % Recovery |
|---|---|
| $B_1$ | 100 |
| $B_2$ | 70 |
| $G_1$ | 105* |
| $G_2$ | 112* |

*Reported values in excess of 100% are the result of experimental error.

Although the retention and recovery of aflatoxins $M_1$ and $M_2$ were not determined, similar results would be expected for aflatoxins $M_1$ and $M_2$ in view of the structural similarities of these aflatoxins with those tested.

EXAMPLE 3

This example further verifies the effectiveness of the brominated β-cyclodextrin/epichlorohydrin copolymer prepared as in Example 1 for the removal, detection, and quantification of aflatoxins in contaminated samples. In particular, this example demonstrates the low level of interferences resulting from use of the brominated β-cyclodextrin/epichlorohydrin copolymer and sets forth an even more preferred chromatographic procedure for the analysis of samples which results in less interferences as compared to the procedure utilized in Example 2.

Fifty grams of ground food samples (corn and peanuts) were transferred to a blender jar, and 100 ml of acetonitrile was added. The mixture was blended at high speed for 2 minutes. The slurry was filtered through a fluted filter paper. Fifty milliliters of the filtrate was diluted with 75 ml distilled water, and 20 ml of this solution was diluted to 50 ml with distilled water. Finally, 5 ml of this solution was diluted to 15 ml with distilled water and passed through a brominated β-cyclodextrin/epichlorohydrin copolymer column (i.d.= 0.8, length=5.2 cm) prepared in a manner similar to the column of Example 1. The solution was passed through the column using a Vicam Mycotoxin Testing System Apparatus.

The column was then washed with 10 ml of 5% methanol/water, and the aflatoxins were eluted off the column with 5.5 ml of 80% methanol/water. The eluant was diluted to 6.0 ml with distilled water, and 25 μl of this solution was injected into the HPLC using the HPLC system of Example 2.

The representative chromatogram for the corn sample is presented in FIG. 4 and verifies the effectiveness of the column and procedure in purifying aflatoxins with reduced interferences. The principal interference which is greatly reduced by the use of the column and procedure is the peak at 10.02 minutes. This interference would normally interfere with the analyses for aflatoxins $B_1$ and $B_2$.

EXAMPLE 4

This example confirms the effectiveness of the brominated β-cyclodextrin/epichlorohydrin copolymer column prepared as in Example 2 for the removal, detection, and quantification of phytoestrogens from contaminated samples.

Sample extracts containing phytoestrogens were prepared by grinding soybeans and soy-based infant formula to a finely divided powder. Sample extract to be loaded on the brominated β-cyclodextrin/epichlorohydrin column of Example 2 was processed by transferring 2 g of the powder to a glass-stoppered Erlenmeyer flask, and adding 6 ml of 1M hydrochloric acid and 24 ml of dry acetonitrile. The mixture was stirred for 30 minutes at room temperature and was then centrifuged for approximately 10 minutes. One ml of the supernatant liquid was diluted with 1 ml distilled water and filtered through a glass fiber filter. One part of the filtrate was diluted with four parts of water, and a volume of the solution was pipetted onto the brominated β-cyclodextrin/epichlorohydrin column. The column was washed once with 2 ml of distilled water, followed by 2 ml of a 10% methanol/water mixture. Phytoestrogens were then eluted from the column with a 9:1 mixture of acetonitrile and methanol. The final eluant was then injected into an HPLC.

The HPLC system utilized the following: Waters Model 510 liquid chromatograph pump equipped with a 20 ml injection loop and a Waters Model 991 photodiode array detector. A Rexchrom S5-100 ODS (25 cm×5 cm i.d.) reverse phase column was used to separate the phytoestrogens. The mobile phase was a 6:4 ratio mixture of methanol and 10 mM ammonium acetate, and the flow rate was set at 1 ml/min. The phytoestrogens were monitored at 250 nm, and the peak height or peak area was used to calculate the concentrations of the separated phytoestrogens.

For comparison, an attempt was made to evaluate the total phytoestrogens present in the sample extract prior to cleanup on the brominated β-cyclodextrin/epichlorohydrin column. This attempt was carried out by transferring 2 g of the powdered sample to a glass-stoppered Erlenmeyer flask and adding 24 ml of 1 M hydrochloric acid. The mixture was heated on a steam bath for 2 hours, and cooled to room temperature before adding 96 ml acetonitrile. The suspension was centrifuged, and the supernatant liquid was injected into the HPLC using the aforementioned HPLC system.

Representative chromatograms presented in FIG. 5 validate the effectiveness of the column in purifying phytoestrogens. Curves A and B represent the HPLC chromatograms obtained from the sample extracts without and with the modified cyclodextrin cleanup, respectively. Peaks 1 and 2 are associated with the particular phytoestrogens daidzein and genistein, respectively. The portion of Curve A which is off-scale is due to impurities present in the sample. Curve A, therefore, shows that in the absence of purification with use of the brominated β-cyclodextrin/epichlorohydrin column, high levels of impurities are present. In contrast, Curve B confirms the effectiveness of the column in selectively retaining phytoestrogens and removing impurities. Representative phytoestrogen percent recovery values obtained using the brominated β-cyclodextrin/epichlorohydrin copolymer for purification are presented in Table 2. These values illustrate the excellent recovery of phytoestrogens upon elution from the brominated β-cyclodextrin/epichlorohydrin column.

TABLE 2

Recovery of phytoestrogens from the brominated β-cyclodextrin epichlorohydrin copolymer column

| Phytoestrogen | % Recovery |
|---|---|
| Daidzein | >90 |
| Genistein | >90 |

Although the retention and recovery of other phytoestrogens were not determined, similar results would be expected for these other phytoestrogens in view of their structural similarities to those tested.

It is possible that additional interfering materials not present in corn or soy, but present in other samples, could interfere with the removal, detection, or quantification of aflatoxins and phytoestrogens. However, it is anticipated that the present inventive brominated cyclodextrin/epichlorohydrin copolymer can be successfully employed to remove, detect, or quantitate aflatoxins and phytoestrogens in these alternative samples upon making requisite changes to the sample preparation and/or chromatographic procedures indicated. Individuals skilled in the art would be familiar with these requisite modifications.

EXAMPLE 5

This example describes a method of preparing the azido derivative of cyclodextrin/epichlorohydrin copolymer and an evaluation of that derivative in retaining aflatoxins.

The tosyl derivative of β-cyclodextrin/epichlorohydrin copolymer was prepared as detailed in Example 1. Two grams of the tosylate was suspended in 30 ml of dry N,N-dimethylformamide. The mixture was heated with stirring in an oil bath maintained at 80° C., and 1.6 g of powdered sodium azide was added. The suspension was stirred for 12 hours. After cooling, the mixture was poured into 500 ml of distilled water, filtered, and washed with distilled water, followed by 100 ml of anhydrous methanol. The precipitate was dried in a current of air for 3 hours. An infrared spectrum confirmed the presence of the azido group.

The azido derivative was evaluated with respect to its effectiveness in removing, detecting, and quantifying aflatoxins in a manner similar to that set forth in Example 2. These tests on the azido derivative showed that it was effective in retaining aflatoxins; however, the effectiveness in this regard was less than that found for the bromo derivative.

EXAMPLE 6

This example describes a method of preparing the amino derivative of cyclodextrin/epichlorohydrin copolymer and an evaluation of that derivative in retaining aflatoxins.

About 1.46 grams of the azido derivative of Example 5 was suspended in a mixture of 50 ml dioxane and 10 ml methanol. The reaction vessel was purged with argon gas, and 3 g of triphenylphosphine was added. The mixture was stirred at room temperature for 18 hours. Five ml of concentrated ammonium hydroxide solution was then added, followed by stirring at ambient temperature for 48 hours. The supernatant liquid was decanted from the precipitate, and 100 ml of methanol was added with stirring. The precipitate was again allowed to settle, and the supernatant liquid was poured off. This wash procedure was repeated twice more. Finally, the precipitate was filtered off, washed with 100 ml of methanol, and dried in a current of air for 3 hours. The product yield was 1.45 grams.

The amino derivative was evaluated with respect to its effectiveness in removing, detecting, and quantifying aflatoxins in a manner similar to that set forth in Example 2. These tests on the amino derivative showed that it was only marginally effective in retaining aflatoxins.

EXAMPLE 7

This example describes a method of preparing the chloro derivative of cyclodextrin/epichlorohydrin copolymer and an evaluation of that derivative in retaining aflatoxins.

Two grams of the tosyl derivative of Example 1 and six grams of anhydrous lithium chloride were suspended in 75 ml of anhydrous N,N-dimethylformamide. The mixture was heated with stirring in an oil bath at 105° C. for 72 hours. The cooled mixture was poured into 700 ml distilled water with stirring and then allowed to stand until the precipitate settled to the bottom. The supernatant liquid was decanted off, and the wash procedure was repeated with another 700 ml aliquot of distilled water. The residual precipitate was filtered off and washed with 500 ml distilled water, followed by 300 ml of pure methanol. The precipitate was then dried in a current of air for 3 hours. The product yield was 1.7 grams. An elemental analysis confirmed a carbon content of 46.96%, a hydrogen content of 6.45%, and a chlorine content of 2.54%.

The chloro derivative was evaluated with respect to its effectiveness in removing, detecting, and quantifying aflatoxins in a manner similar to that set forth in Example 2. These tests on the chloro derivative showed that it was at least as effective in retaining aflatoxins as the bromo derivative.

EXAMPLE 8

This example describes a method of preparing the iodo derivative of cyclodextrin/epichlorohydrin copolymer and an evaluation of that derivative in retaining aflatoxins.

Three grams of the tosyl derivative of Example 1 and five grams of anhydrous sodium iodide were suspended in 75 ml of anhydrous N,N-dimethylformamide. The mixture was heated with stirring in an oil bath at 90° C. for 24 hours. The cooled mixture was poured into 700 ml distilled water with stirring and then allowed to stand until the precipitate settled to the bottom. The supernatant liquid was decanted off, and the wash procedure was repeated with another 700 ml aliquot of distilled water. A solution of 3 grams of sodium thiosulfate in 500 ml distilled water was added, and the mixture stirred until the brown precipitate turned white in color. The suspension was filtered, and the precipitate was washed with 500 ml distilled water, followed by 300 ml of pure methanol. The precipitate was then dried in a current of air for 3 hours. The product yield was 2.8 grams. An elemental analysis confirmed a carbon content of 46.93%, a hydrogen content of 6.71%, and a iodine content of 3.04%.

The iodo derivative was evaluated with respect to its effectiveness in removing, detecting, and quantifying aflatoxins in a manner similar to that set forth in Example 2. These tests on the iodo derivative showed that it was at least as effective in retaining aflatoxins as the bromo derivative.

All of the references cited herein are hereby incorporated in their entireties by reference.

While this invention has been described with an emphasis upon preferred embodiments, it will be obvious to those of ordinary skill in the art that variations in the preferred compounds and methods may be used and that it is intended that the invention may be practiced otherwise than as specifically described herein. Accordingly, this invention includes all modifications encompassed within the spirit and scope of the invention as defined by the following claims.

What is claimed is:

1. A method of removing aflatoxins from a sample, which method comprises:

(a) preparing the sample containing said aflatoxins, (b) contacting said sample with a compound selected from the group consisting of halo, azido, and amino cyclodextrin/epichlorohydrin copolymers under conditions suitable to effect entrapment of said aflatoxins by said compound, and (c) removing the entrapped aflatoxins from said sample.

2. The method of claim 1, wherein said compound is a brominated cyclodextrin/epichlorohydrin copolymer.

3. The method of claim 2, wherein said cyclodextrin is β-cyclodextrin.

4. A method of removing phytoestrogens from a sample, which method comprises:

(a) preparing the sample containing said phytoestrogens, (b) contacting said sample with a compound selected from the group consisting of halo, azido, and amino cyclodextrin/epichlorohydrin copolymers under conditions suitable to effect entrapment of said phytoestrogens by said compound, and (c) removing the entrapped phytoestrogens from said sample.

5. The method of claim 4, wherein said compound is a brominated cyclodextrin/epichlorohydrin copolymer.

6. The method of claim 5, wherein said cyclodextrin is β-cyclodextrin.

7. A method of detecting the presence of aflatoxins in a sample, which method comprises:

(a) preparing said sample, (b) contacting said sample with a compound selected from the group consisting of a halo, azido, and amino cyclodextrin/epichlorohydrin copolymer under conditions suitable to effect entrapment of any aflatoxins present in said sample by said compound, (c) removing any unentrapped aflatoxin from said sample, and (d) analyzing said compound to detect the presence of aflatoxins.

8. The method of claim 7, wherein said compound is a brominated cyclodextrin/epichlorohydrin copolymer.

9. The method of claim 8, wherein said cyclodextrin is β-cyclodextrin.

10. The method of claim 9, wherein said analyzing of said compound to detect the presence of aflatoxins includes eluting any entrapped aflatoxin from said compound and detecting the presence of aflatoxins in the eluant.

11. The method of claim 10, which method further comprises quantifying said aflatoxins in said eluant and correlating the quantity of aflatoxins in the eluant to the quantity of aflatoxins in said sample.

12. A method of detecting the presence of phytoestrogens in a sample, which method comprises:

(a) preparing said sample, (b) contacting said sample with a compound selected from the group consisting of a halo, azido, and amino cyclodextrin/epichlorohydrin copolymer under conditions suitable to effect entrapment of any phytoestrogens present in said sample by said compound, (c) removing any unentrapped phytoestrogen from said sample, and (d) analyzing said compound to detect the presence of phytoestrogens.

13. The method of claim 12, wherein said compound is a brominated cyclodextrin/epichlorohydrin copolymer.

14. The method of claim 13, wherein said cyclodextrin is β-cyclodextrin.

15. The method of claim 14, wherein said analyzing of said compound to detect the presence of phytoestrogens includes eluting any entrapped phytoestrogens from said compound and detecting the presence of phytoestrogens in the eluant.

16. The method of claim 15, which method further comprises quantifying said phytoestrogens in said eluant and correlating the quantity of phytoestrogens in the eluant to the quantity of phytoestrogens in said sample.

* * * * *